(12) United States Patent
Tsai et al.

(10) Patent No.: US 8,364,205 B2
(45) Date of Patent: Jan. 29, 2013

(54) MOBILE PHONE AND METHOD FOR SELECTING A SIM CARD

(75) Inventors: Hish-Hsien Tsai, Tu-Cheng (TW); Yi-Wen Liu, Tu-Cheng (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 0 days.

(21) Appl. No.: 13/159,375

(22) Filed: Jun. 13, 2011

(65) Prior Publication Data

US 2012/0302290 A1    Nov. 29, 2012

(30) Foreign Application Priority Data

May 23, 2011  (TW) .................................. 100117914

(51) Int. Cl.
*H04M 1/00* (2006.01)
*H04B 1/38* (2006.01)
(52) U.S. Cl. ...................... 455/558; 455/407; 455/432.1; 455/435.2; 455/552.1; 379/114.01; 379/114.02; 379/114.27; 379/433.09

(58) Field of Classification Search .................. 455/407, 455/410, 411, 432.1, 432.3, 433, 435.1–435.3, 455/550.1; 340/5.8, 5.81; 361/737; 370/252; 379/114.01, 114.27–114.29, 144.04, 144.06, 379/211.05
See application file for complete search history.

(56) References Cited

U.S. PATENT DOCUMENTS

| 6,445,785 B1* | 9/2002 | Chan et al. ............... 379/221.13 |
| 2010/0009716 A1* | 1/2010 | Lee et al. ...................... 455/558 |

* cited by examiner

*Primary Examiner* — Marisol Figueroa
*Assistant Examiner* — Erica Navar
(74) *Attorney, Agent, or Firm* — Altis Law Group, Inc.

(57) ABSTRACT

A mobile phone includes at least two subscriber identity module (SIM) cards. The mobile phone queries a number portability database (NPDB) for at least two telecom operators of the at least two SIM cards. The mobile phone queries the NPDB for a telecom operator of an outgoing number dialed using the mobile phone. The mobile phone selects one SIM card with one telecom operator same as the telecom operator of the outgoing number from the at least two SIM cards.

6 Claims, 5 Drawing Sheets

MOBILE PHONE AND METHOD FOR SELECTING A SIM CARD

BACKGROUND

1. Technical Field

The present disclosure relates to mobile communications, and more particularly to a mobile phone and a method for selecting a subscriber identity module (SIM) card.

2. Description of Related Art

Mobile phones with multiple subscriber identity module (SIM) cards are now in widespread use. Thus, users can select one SIM card from the multiple SIM cards of a mobile phone to dial a phone number, so as to save money or identify different callees.

However, the mobile phone with multiple SIM cards needs the users to manually select one SIM card, which is very inconvenient.

BRIEF DESCRIPTION OF THE DRAWINGS

The details of the disclosure, both as to its structure and operation, can be best understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
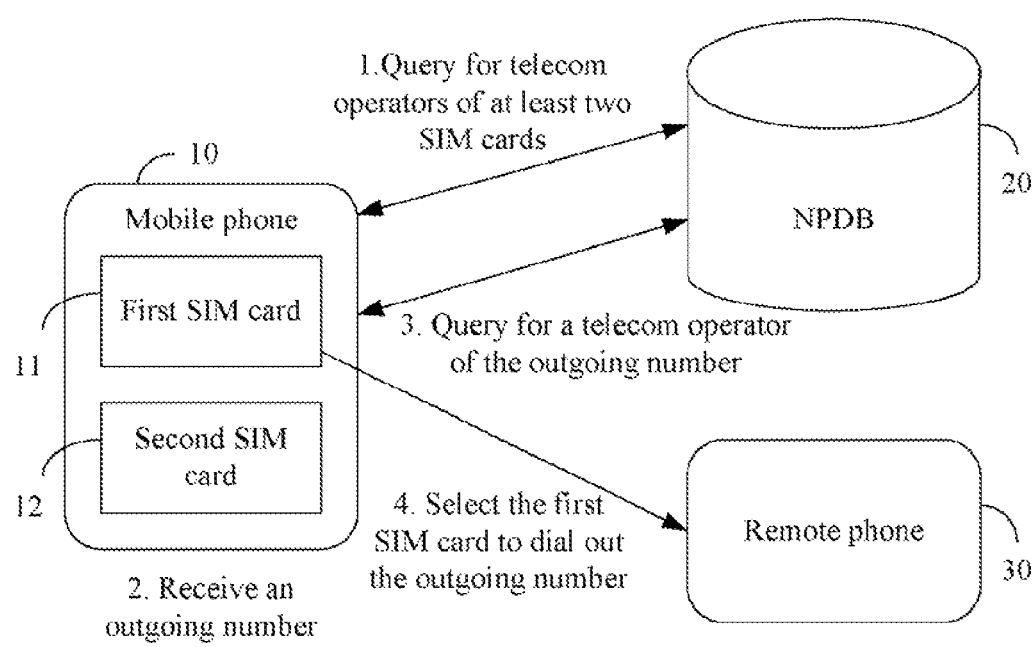
FIG. 1 is a schematic diagram of an application environment of one embodiment of a mobile phone in accordance with the present disclosure.

FIG. 1 is a schematic diagram of an application environment of one embodiment of a mobile phone 10 in accordance with the present disclosure. In one embodiment, the mobile phone 10 includes at least two subscriber identity module (SIM) cards, such as a first SIM card 11 and a second SIM card 12. The at least two SIM cards 11, 12 are applied from different telecom operators. A user can set one of the at least two SIM cards 11, 12 as a default SIM card. In one example, the telecom operator of the first SIM card 11 may be Verizon wireless, the telecom operator of the second SIM card 12 may be AT&T, and the first SIM card 11 may be set as the default SIM card.

When the mobile phone 10 is started, the at least two SIM cards 11, 12 of the mobile phone 10 is registered with the telecom operator, and a number portability database (NPDB) 20 is queried from the telecom operator of the at least two SIM cards, such as Verizon and AT&T.

In one embodiment, the mobile phone 10 scans proper base stations of the telecom operators of the at least two SIM cards, and then registers with the proper base stations so as to register with the telecom operators. The mobile phone 10 does not know the telecom operators of the at least two SIM cards 11, 12 even if the mobile phone 10 registers with the telecom operators. Thus, the mobile phone 10 needs to query the NPDB 20 for the telecom operators of the at least two SIM cards 11, 12.

In another embodiment, the mobile phone 10 may know the telecom operators of the at least two SIM cards 11, 12 after registering with the telecom operators of the at least two telecom operators. In such a case, the mobile phone 10 does not need to query the NPDB 20 for the telecom operators of the at least two SIM cards 11, 12.

In one embodiment, if a user needs to call a remote phone 30, the user uses the mobile phone 10 to dial a telephone number of the remote phone 30 (called as "outgoing number" hereinafter). When receiving the outgoing number inputted by the user, the mobile phone 10 queries the NPDB 20 for a telecom operator of the outgoing number and selects one SIM card with one telecom operator same as the telecom operator of the outgoing number.

Figure 2:
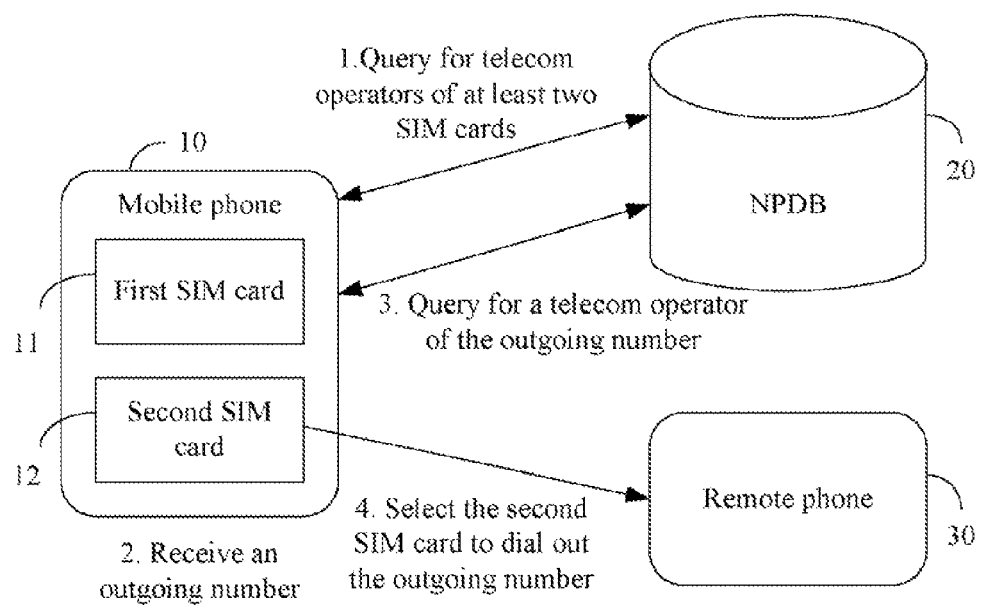
FIG. 2 is a schematic diagram of an application environment of another embodiment of the mobile phone in accordance with the present disclosure.

For example, if the telecom operator of the outgoing number is Verizon wireless, which is the same as the telecom operator of the first SIM card 11, then the mobile phone 10 selects the first SIM card 11 to dial out the outgoing number as shown in FIG. 1. If the telecom operator of the outgoing number is AT&T, which is the same as the telecom operator of the second SIM card 12, then the mobile phone 10 selects the second SIM card 12 to dial out the outgoing number as shown in FIG. 2.

Figure 3:
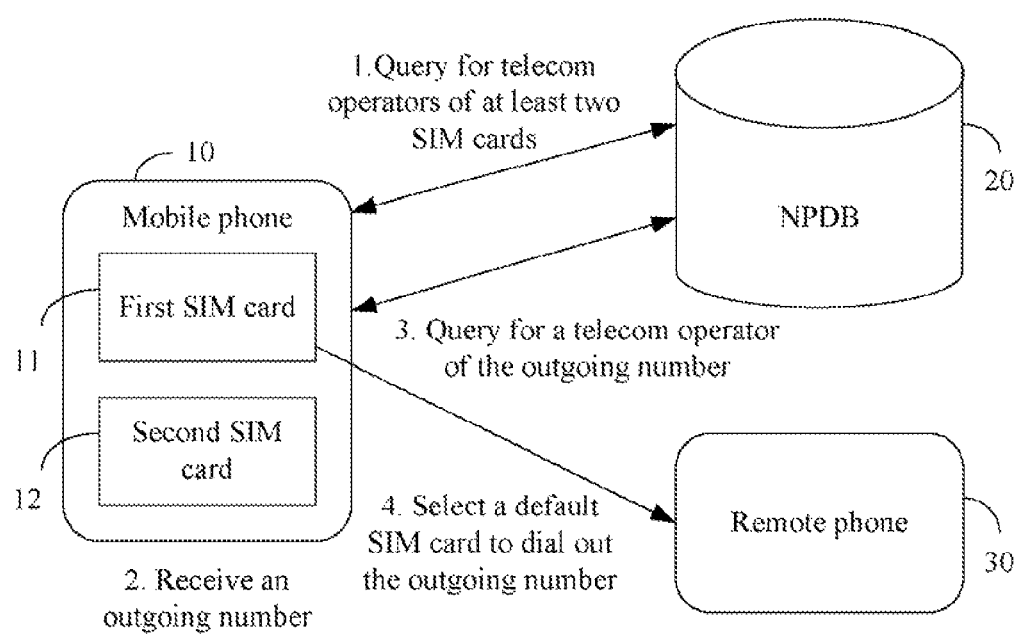
FIG. 3 is a schematic diagram of an application environment of a further embodiment of the mobile phone in accordance with the present disclosure.

In another embodiment, the telecom operator of the outgoing number may be different from the telecom operator of any one of the at least two SIM cards 11, 12 of the mobile phone 10. In such a case, the mobile phone 10 selects the default SIM card to dial out the outgoing number as shown in FIG. 3. For example, if the telecom operator of the outgoing number is Sprint, which is different from the telecom operator of the first SIM card 11 and the second SIM card 12, then the mobile phone 10 selects the default SIM card 11 to dial out the outgoing number.

Figure 4:
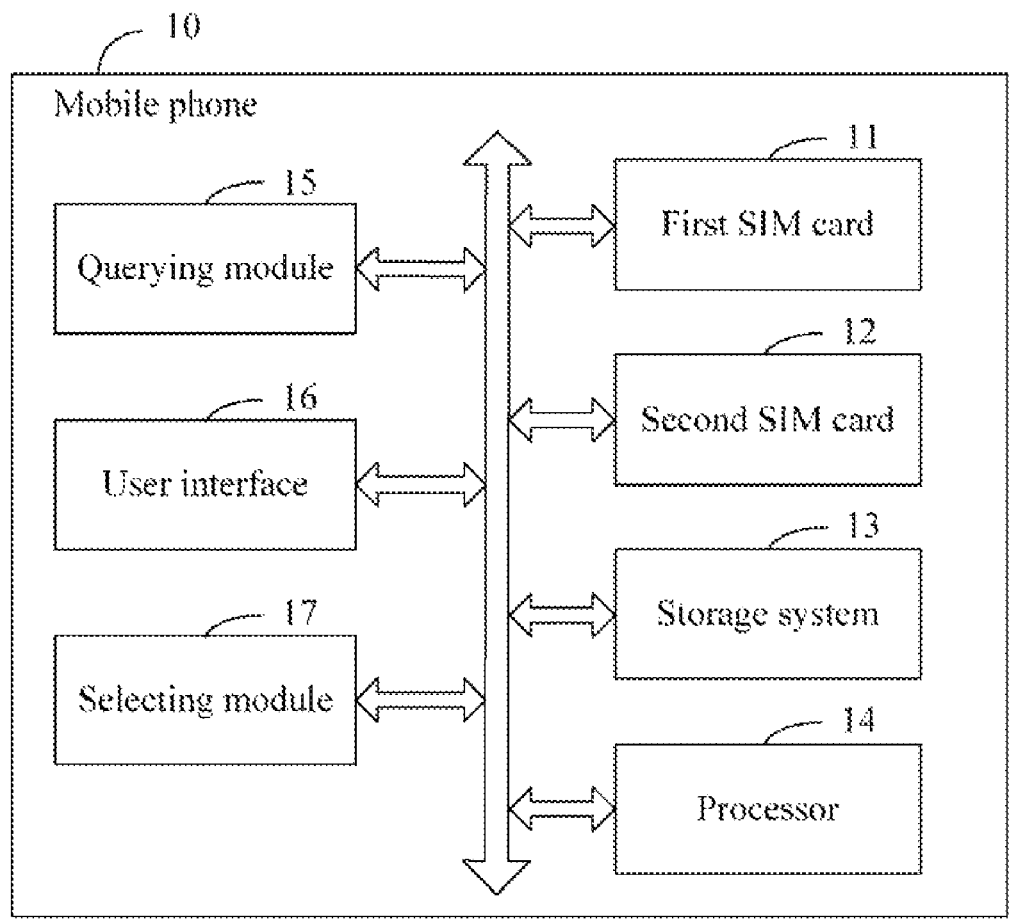
FIG. 4 is a schematic diagram of one embodiment of the mobile phone including functional modules.

FIG. 4 is a schematic diagram of one embodiment of the mobile phone 10 including functional modules. In one embodiment, the mobile phone 10 includes at least two SIM cards 11, 12, a storage system 13, at least one processor 14, a querying module 15, a user interface 16, and a selecting module 17. The modules 15 and 17 may comprise computerized code in the form of one or more programs that are stored in the storage system 13. The computerized code includes instructions that are executed by the at least one processor 14 to provide functions for the modules 15 and 17. In one example, the storage system 13 may be flash memory, or other computerized memory device.

The user interface 16 is operable to provide a user interface on a display of the mobile phone 10, by providing a function to dial phone numbers for a user, and receive an outgoing number inputted by the user. The querying module 15 is operable to query the NPDB 20 for at least two telecom operators of the at least two SIM cards 11, 12, and query the NPDB 20 for a telecom operator of the outgoing number. The selecting module 17 is operable to select one SIM card with one telecom operator same as the telecom operator of the outgoing number from the at least two SIM cards 11, 12.

The storage system 13 is further operable to store a plurality of history telecom operators of history outgoing numbers that are queried from the NPDB 20. In one example, the storage system 13 includes a cache, and store the plurality of history telecom operators of the history outgoing numbers in the cache.

In order to avoid re-query the NPDB 20 for the telecom operator of the same outgoing number, a caching mechanism is provided. In detail, when one outgoing number is dialed by the user at the first time, the mobile phone 10 queries the NPDB 20 for the telecom operator of the outgoing number, and stores a querying result (namely the telecom operator of the outgoing number) and a querying time in the cache of the storage system 13. Afterwards, the mobile phone 10 can directly obtain the telecom operator of the outgoing number from the cache of the storage system 13 if the same outgoing number is dialed by the user again. Thus, the mobile phone 10 does not need to re-query the NPDB 20 for the telecom operator of the same outgoing number, which reduce time of dialing out the same outgoing number.

It should be noted that each of the plurality of history telecom operators of history outgoing numbers stored in the storage system 13 has a validity period, which is started from the corresponding querying time. In one example, the validity period may be 24 hours.

In one embodiment, when the user interface 16 receives one outgoing number inputted by a user, the querying module 15 determines whether one telecom operator of the one outgoing number is found in the storage system 13. If the telecom operator of the one outgoing number is found in the storage system 13, the querying module 15 further determines whether a validity period of the found telecom operator expires. The querying module 15 obtains the found telecom operator from the storage system 13 if the validity period of the found telecom operator does not expire. The querying module 15 queries the NPDB 20 for the telecom operator of the one outgoing number if the validity period of the found telecom operator expires. The selecting module 17 determines whether the telecom operator of the one outgoing number is the same as the telecom operator of any one of the at least two SIM cards 11, 12. The selecting module 17 selects one SIM card to dial out the one outgoing number if the telecom operator of the one outgoing number is the same as the telecom operator of the one SIM card. The selecting module 17 selects the default SIM card to dial out the one outgoing number if the telecom operator of the one outgoing number is different from the telecom operator of any one of the at least two SIM cards 11, 12.

Figure 5:
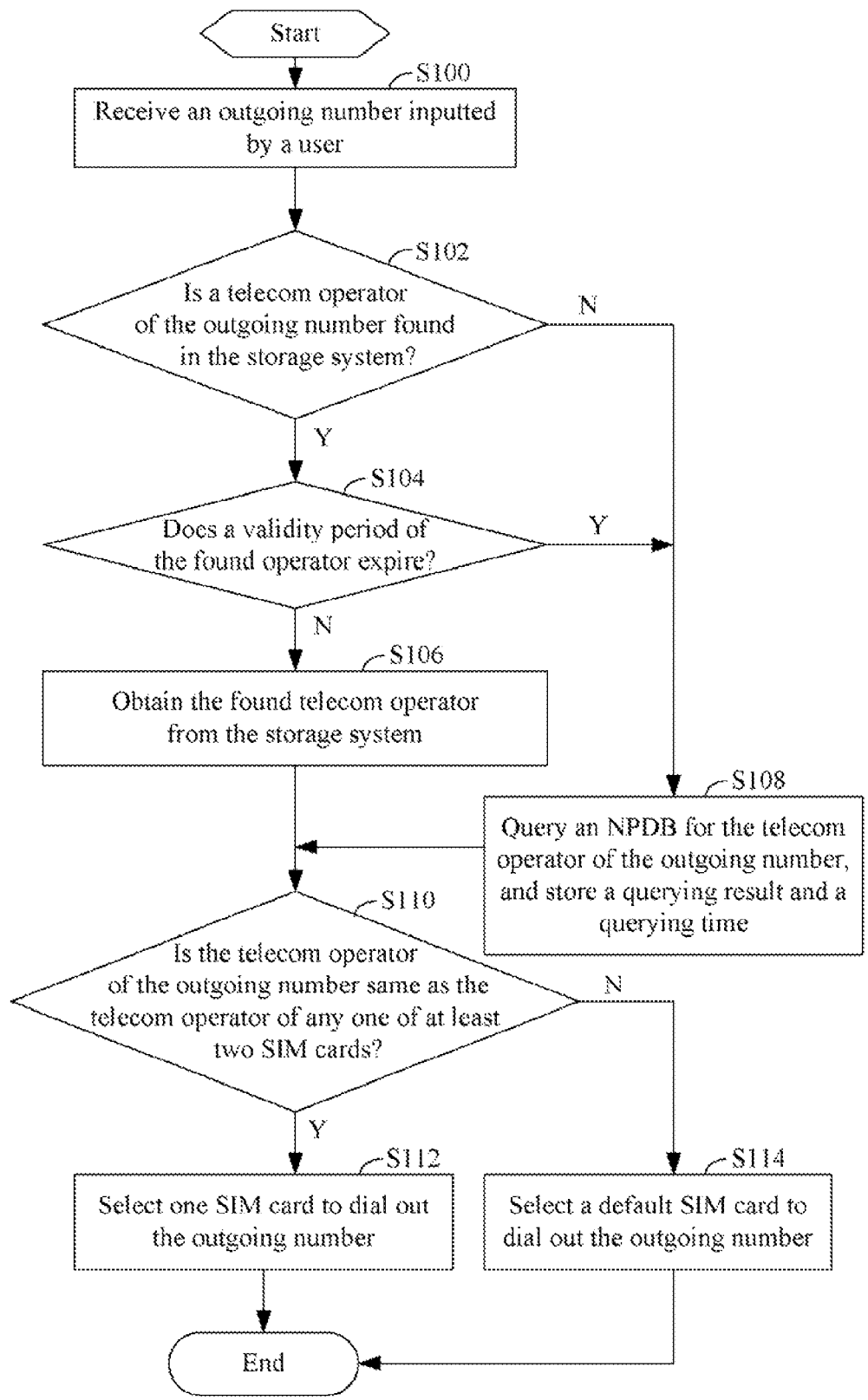
FIG. 5 is a flowchart of one embodiment of a method for selecting a subscriber identity module (SIM) card in accordance with the present disclosure.

FIG. 5 is a flowchart of one embodiment of a method for selecting a SIM card in accordance with the present disclosure. In one embodiment, the method is executed by the functional modules such as those of FIG. 4. Depending on the embodiment, additional blocks may be added, others deleted, and the ordering of the blocks may be changed while remaining well within the scope of the disclosure.

In block S100, the user interface 16 receives an outgoing number inputted by a user.

In block S102, the querying module 15 determines whether a telecom operator of the outgoing number is found in the storage system 13.

If the telecom operator of the outgoing number is found in the storage system 13, in block S104, the querying module 15 determines whether a validity period of the found telecom operator expires.

If the validity period of the found telecom operator does not expire, in block S106, the querying module 15 obtains the found telecom operator, namely the telecom operator of the outgoing number, from the storage system 13.

If the determining result of block S102 is that the telecom operator of the outgoing number is not found in the storage system 13, or the determining result of block S104 is that the validity period of the found telecom operator expires, in block S108, the querying module 15 queries the NPDB 20 for the telecom operator of the outgoing number, and stores a querying result (namely the telecom operator of the outgoing number) and a querying time in the storage system 13.

In block S110, the selecting module 17 determines whether the telecom operator of the outgoing number is the same as the telecom operator of any one of the at least two SIM cards 11, 12.

If the telecom operator of the outgoing number is the same as the telecom operator of one of the at least two SIM cards 11, 12, in block S112, the selecting module 17 selects the one SIM card to dial out the outgoing number.

If the telecom operator of the outgoing number is different from the telecom operator of any one of the at least two SIM cards 11, 12, in block S114, the selecting module 17 selects the default SIM card to dial out the outgoing number.

In conclusion, the mobile phone 10 of the present disclosure automatically selects one SIM card with one telecom operator the same as the telecom operator of the outgoing number from the at least two SIM cards 11, 12, which is very convenient.

While various embodiments of the present disclosure have been described above, it should be understood that they have been presented using example and not using limitation. Thus the breadth and scope of the present disclosure should not be limited by the above-described embodiments, but should be defined in accordance with the following claims and their equivalents.

What is claimed is:

1. A mobile phone, comprising:
   at least two subscriber identity module (SIM) cards;
   at least one processor;
   a storage system to store a plurality of history telecom operators of history outgoing numbers that are queried from a number portability database (NPDB), and one or more programs that are executed by the at least one processor, the one or more programs comprising:
   a querying module operable to query the NPDB for at least two telecom operators of the at least two SIM cards, and determine whether a telecom operator of an outgoing number dialed using the mobile phone is found in the storage system, and whether a validity period of the telecom operator of the outgoing number in the storage system expires when the telecom operator of the outgoing number is found in the storage system, obtain the telecom operator of the outgoing number from the storage system when the validity period does not expire, and query the NPDB for the telecom operator of the outgoing number when the validity period expires; and
   a selecting module operable to select one SIM card with one telecom operator same as the telecom operator of the outgoing number from the at least two SIM cards.

2. The mobile phone of claim 1, wherein the selecting module is further operable to set one of the at least two SIM cards as a default SIM card.

3. The mobile phone of claim 2, wherein the selecting module is further operable to determine whether the telecom operator of the outgoing number is the same as the telecom operator of any one of the at least two SIM cards, select one SIM card to dial out the outgoing number upon the condition that the telecom operator of the outgoing number is the same as the telecom operator of the one SIM card, and select the default SIM card to dial out the outgoing number upon the condition that the telecom operator of the outgoing number is different from the telecom operator of any one of the at least two SIM cards.

4. A method for selecting a subscriber identity module (SIM) card of a mobile phone comprising at least two subscriber identity module (SIM) cards, the method comprising:
   providing a plurality of history telecom operators of history outgoing numbers that are queried from a number portability database (NPDB);
   querying the NPDB for at least two telecom operators of the at least two SIM cards;
   receiving an outgoing number inputted by a user;
   determining whether a telecom operator of the outgoing number is found in a storage system of the mobile device;
   determining whether a validity period of the telecom operator of the outgoing number in the storage system expires; if the telecom operator of the outgoing number is found in the storage system,
   obtaining the telecom operator of the outgoing number from the storage system if the validity period does not expire; and
   querying the NPDB for the telecom operator of the outgoing number if the validity period expires; and
   selecting one SIM card with one telecom operator same as the telecom operator of the outgoing number from the at least two SIM cards.

5. The method of claim 4, further comprising: setting one of the at least two SIM cards as a default SIM card.

6. The method of claim 5, further comprising:
   determining whether the telecom operator of the outgoing number is the same as the telecom operator of any one of the at least two SIM cards;
   selecting one SIM card to dial out the outgoing number if the telecom operator of the outgoing number is the same as the telecom operator of the one SIM card; and
   selecting the default SIM card to dial out the outgoing number if the telecom operator of the outgoing number is different from the telecom operator of any one of the at least two SIM cards.

\* \* \* \* \*